Feb. 2, 1926.
A. J. DESCOTEAU
ROD OR TUBE COUPLING
Filed Feb. 14, 1924
1,571,661
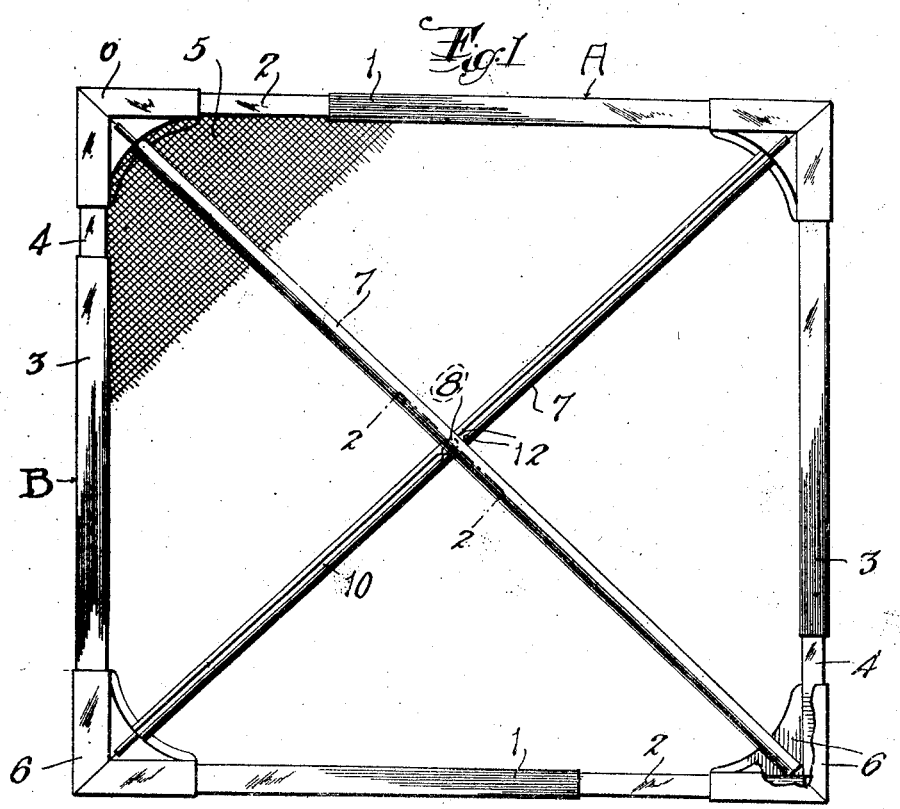
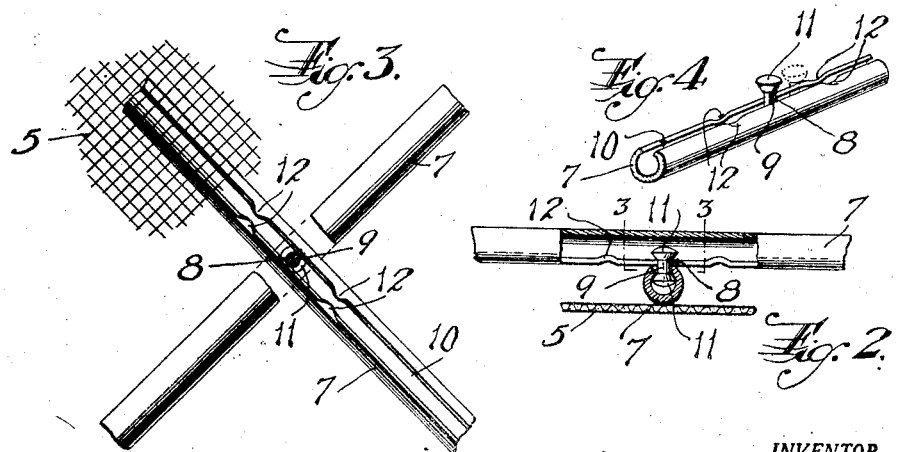
INVENTOR.
Adelard J. Descoteau,
BY
Everitt Cook, ATTORNEYS.

Patented Feb. 2, 1926.

1,571,661

UNITED STATES PATENT OFFICE.

ADELARD J. DESCOTEAU, OF NEWARK, NEW JERSEY, ASSIGNOR TO THE FOSTER SCREEN CO. INC., A CORPORATION OF NEW JERSEY.

ROD OR TUBE COUPLING.

Application filed February 14, 1924. Serial No. 692,662.

*To all whom it may concern:*

Be it known that I, ADELARD J. DESCOTEAU, a citizen of the United States, and a resident of the city of Newark, in the county of Essex and State of New Jersey, have invented new and useful Improvements in Rod or Tube Couplings, of which the following is a specification.

This invention relates in general to rod or tube joints or couplings in which two rods or tubes are pivotally connected in crossed relation for relative pivotal movement. More particularly the invention relates to a joint or coupling for the crossed brace members of adjustable window screens such as shown in Patents No. 1,022,312 dated April 2, 1912, and No. 1,393,616 dated October 11, 1921, in which the sides and ends of the frames are simultaneously adjustable to vary the size of the frames so that pivotal movement of the crossed braces is necessary to accommodate the varying configurations of the frames. In such a device the crossed braces are usually pivotally connected by a fixed rivet passing entirely through both the braces and it is extremely difficult to so position the rivet as to ensure proper co-operation of the braces, the frame frequently becoming jammed during adjustment due to slight inaccuracies in shape of the frame and the incapability of the crossed braces to adapt themselves to these inaccuracies both because of their fixed pivotal relation produced by the rivet and the possible improper location of the rivet.

The primary object of the present invention is to provide a novel and improved rod or tube coupling wherein the crossed rods or tubes shall be capable of relative pivotal movement and each adapted for movement longitudinally of the other, whereby the ends of the rods or tubes may readily adjust themselves to variations in the movement or relative positions of the parts to which they are connected, for instance the corners of an adjustable rectangular window screen frame.

Another object is to provide a rod or tube coupling including a coupling member loosely connected to both of the crossed rods or tubes, whereby the rods or tubes may have the desired relative pivotal and longitudinal movement and the coupling member adapt itself to changes in the relative positions of said crossed rods or tubes.

Further objects are to provide a coupling of the character described in which the coupling member is invisible; to provide such a coupling in which the crossed rods or tubes have longitudinal slots on their adjacent surfaces to loosely receive a coupling member to pivotally connect said rods or tubes, whereby said rods or tubes are capable of both relative pivotal movement and movement longitudinally of each other, the coupling member being free to laterally move longitudinally of both of said slots; to provide such a coupling in which the slots are undercut and the coupling member includes a shank having a head at each end to loosely fit one of said slots with the shank passing loosely through each of the slots; to provide a brace for window screens or the like including two crossed longitudinally slit tubes and a coupling member including a shank to loosely fit the slits of said tubes and hold the coupling member against being pulled longitudinally through said slits, and to obtain other results and advantages as may be brought out by the following description.

For the purpose of illustrating the principles of the invention I have shown the same in the accompanying drawings in connection with an adjustable frame for window screens, but it will be understood that it is within the scope of the invention to utilize the same for connecting rods or tubes for other purposes.

In said drawings in which the same characters of reference designate corresponding and like parts.

Figure 1 is a plan view of a window screen having crossed brace rods embodying the invention.

Figure 2 is an enlarged transverse sectional view taken on the line 2—2 of Figure 1.

Figure 3 is a horizontal sectional view taken on the line 3—3 of Figure 2, and

Figure 4 is a fragmentary perspective view of a portion of one of the braces having the coupling element arranged within.

In these specific embodiments of the invention shown on the drawings, the window frame comprises adjustable sides and ends A and B formed of telescoping sections 1, 2, 3 and 4 which have slidably connected therebetween a single piece of loosely woven wire screen 5 arranged within the frame with the wire strands running diagonally thereof, the ends of the adjacent side and end pieces being connected by corner pieces 6. In the operation of such a screen, pressure upon the ends of the frame will cause the sides to collapse or shorten and the ends to extend or lengthen, or vice versa, adjusting the length or breadth of the screen for any desired purpose such as adjusting it to window frames of different sizes or for positioning the screen in or removing it from a window.

For the purpose of preventing the frame of the screen from warping, to reinforce the frame and to guide the sides and ends during adjustment thereof, crossed braces 7 are utilized, each of said braces having its ends connected to diagonally opposite corner pieces 6, and said braces being pivotally connected intermediate their ends for relative pivotal movement when the frame of the screen is adjusted.

In the present instance, the braces 7 consist of metal tubes longitudinally slotted throughout their lengths, and said tubes may be conveniently formed by rolling a flat sheet of metal until its edges approach each other in spaced relation. The braces 7 are crossed with the slotted sides thereof adjacent to each other, and in accordance with the invention a coupling element 8 is connected to both of the braces 7 intermediate their ends to pivotally connect the braces. Said coupling element may comprise a cylindrical shank 9 adapted to loosely pass through the slot 10 of each of the braces 7, said shank being provided at each end thereof with an integral enlarged head 11 adapted to be arranged within one of the braces 7. One convenient manner of connecting the braces by the coupling element 8 is to slip the coupling element into the slot 10 of one brace from the end thereof with the head arranged within the brace and the shank projecting laterally therefrom, the other head of the coupling element then being similarly slipped into the end of the other brace and the coupling element slid longitudinally of the two braces to approximately the central point in the length of each of the braces. With this construction it will be observed that the braces 7 are adapted for relative pivotal movement and that the coupling element 8 is capable of movement longitudinally of both of the braces 7, whereby either brace may move longitudinally of the other to relatively adjust the braces for proper cooperation with the adjustable frame of the window screen. The braces are held against lateral movement away from each other by the heads 11 of the coupling element and said heads 11 also hold the coupling element against displacement from the braces 7. To limit the movement of the coupling element longitudinally of the braces, the edges of the slots 10 of the respective braces may be crimped or pressed inwardly to partly close the slots at opposite sides of the coupling element as shown in Figures 1, 3, and 4 of the drawings.

The connection of the ends of the braces to the corner pieces of the frames may be any suitable one whereby the braces have a slight pivotal or fulcrumed movement in the corner of the frame; for instance, the corner pieces may be substantially channel-shaped in cross section and the ends of the braces loosely fitted between the sides of the corner pieces as shown in the copending application of Otto. R. Kihm Ser. No. 502,649, filed September 23, 1921.

With crossed braces connected in accordance with the invention applied to a window screen frame of character described, it will be observed that the pivotal connection of the braces may adjust itself to inaccuracies in the shape of the frame during the adjustment thereof and prevent jamming or binding of the frame. Furthermore, the assembling of the braces is extremely simple in that no perforation of the braces is necessary as in the case of riveting or bolting, and therefore the difficulties of properly locating the openings for a pivot element such as a rivet are obviated. After the coupling element 8 has been adjusted approximately at the proper points in the lengths of the braces 7, it will adjust itself upon pivotal movement of the braces to the exact points necessary to provide for the correct pivotal movement of the braces to accomplish the objects desired.

While I have shown the invention in connection with tubes having the walls thereof slotted it will be understood that the invention is also susceptible for use in connecting rods by merely slotting the rods or otherwise providing for relative movement of the rods and the coupling element. Further the invention is capable of use for other purposes than connecting crossed braces for window screens.

Obviously many modifications and changes can be made in the detail construction of the coupling element and the crossed members thereby connected without departing from the spirit or scope of the invention and therefore I do not desire to be understood as limiting myself except as required by the following claims when construed in the light of the prior art.

Having thus described the invention, what I claim is:

1. In a coupling of the character described, the combination of a pair of crossed members to be connected each having a longitudinal slot in its surface adjacent the other member, and a coupling element having one end arranged in each of said slots to pivotally connect said members, said coupling element being free to move longitudinally of both said slots and held against longitudinal movement out of said slots.

2. In a coupling of the character described, the combination of a pair of crossed members to be connected each having a longitudinal undercut slot in its surface adjacent the other member, and a coupling element including a shank passing loosely through both said slots and having a head at each end disposed within one of said slots to hold said element against longitudinal movement out of said slots, said coupling element pivotally connecting said members and being free to move longitudinally of both said members.

3. In a tube coupling, the combination of two crossed tubes each having a longitudinal slot in its wall adjacent the other tube, and a coupling element including a shank loosely passing through both said slots and having a head at each end arranged within one of said tubes, said coupling element pivotally connecting said tubes and free to move longitudinally of both thereof.

4. The combination of a rectangular frame having sides and ends each longitudinally adjustable, a rectangular single sheet of woven wire fabric loosely secured at its edges to said frame and having the strands thereof disconnected relatively to each other at their intersections and at their ends and running diagonally to permit said sheet to be stretched longitudinally and transversely, whereby said sheet may be adjusted in length and width simultaneously with said frame, two crossed brace members each having its ends fulcrumed in diagonally opposite corners of said frame, and a coupling element connected to both of said members to pivotally connect said members, said coupling element being free to move longitudinally of both said brace members, whereby said brace members may automatically adjust themselves to said frame and to each other to prevent binding of the frame during adjustment.

5. The combination of a rectangular frame having sides and ends each longitudinally adjustable, a rectangular single sheet of woven wire fabric loosely secured at its edges to said frame and having the strands thereof disconnected relatively to each other at their intersections and at their ends and running diagonally to permit said sheet to be stretched longitudinally and transversely, whereby said sheet may be adjusted in length and width simultaneously with said frame, two crossed brace members each composing a tube having a longitudinal slot in its wall adjacent the other tube and its ends connected to diagonally opposite corners of said frame, and a coupling element comprising a shank loosely passing through both of said slots and having a head at each end thereof arranged within one of said tubes, said coupling element pivotally connecting said tubes and being capable of movement longitudinally of both said tubes, whereby said brace members may automatically adjust themselves to said frame and to each other to prevent binding of the frame during adjustment.

6. In a coupling of the character described the combination of two crossed members to be connected one of which has a longitudinal slot in its surface adjacent the other member, and a coupling member pivotally connecting said members having one end connected in said slot whereby said one of said members is capable of longitudinal movement relatively to the other of said members.

ADELARD J. DESCOTEAU.